United States Patent [19]

Rehrig, Jr.

[11] Patent Number: 4,508,951
[45] Date of Patent: Apr. 2, 1985

[54] FLUID BAFFLE ASSEMBLY FOR A WATER-COOLED WELDING TORCH

[75] Inventor: William Rehrig, Jr., Burbank, Calif.

[73] Assignee: Richard B. Rehrig, Burbank, Calif.

[21] Appl. No.: 409,663

[22] Filed: Aug. 19, 1982

[51] Int. Cl.³ .............................................. B23K 9/00
[52] U.S. Cl. ..................................... 219/74; 219/75; 219/136; 219/137.62
[58] Field of Search .................... 219/137.62, 136, 75, 219/74

[56] References Cited

U.S. PATENT DOCUMENTS 2,727,970 12/1955 Turbett .......................... 219/137.62

Primary Examiner—Roy N. Envall, Jr.
Assistant Examiner—Alfred S. Keve
Attorney, Agent, or Firm—Lyon & Lyon

[57] ABSTRACT

Disclosed herein is a fluid baffle assembly suitable for use in water-cooled welding or cutting torches for providing a fluid passageway for efficient cooling of the torch head. The baffle assembly is comprised of a thin arcuate baffle member held in compression within the cylindrical outer sleeve of the torch head and about the inner body portion of the torch head so as to bifurcate the upstream portion of the water cooling area between the sleeve and the outer body portion of the torch head into separate water inlet and outlet channels. The inlet and outlet channels terminate at the lower end of the baffle in an annular water cooling chamber and at their upper ends communicate with water inlet and outlet tubes so that cooling water can flow from the inlet tube down the inlet channel, about the lower portion of the torch head in the annular water cooling chamber and out the outlet tube via the outlet channel.

4 Claims, 6 Drawing Figures

U.S. Patent  Apr. 2, 1985  Sheet 1 of 2  4,508,951
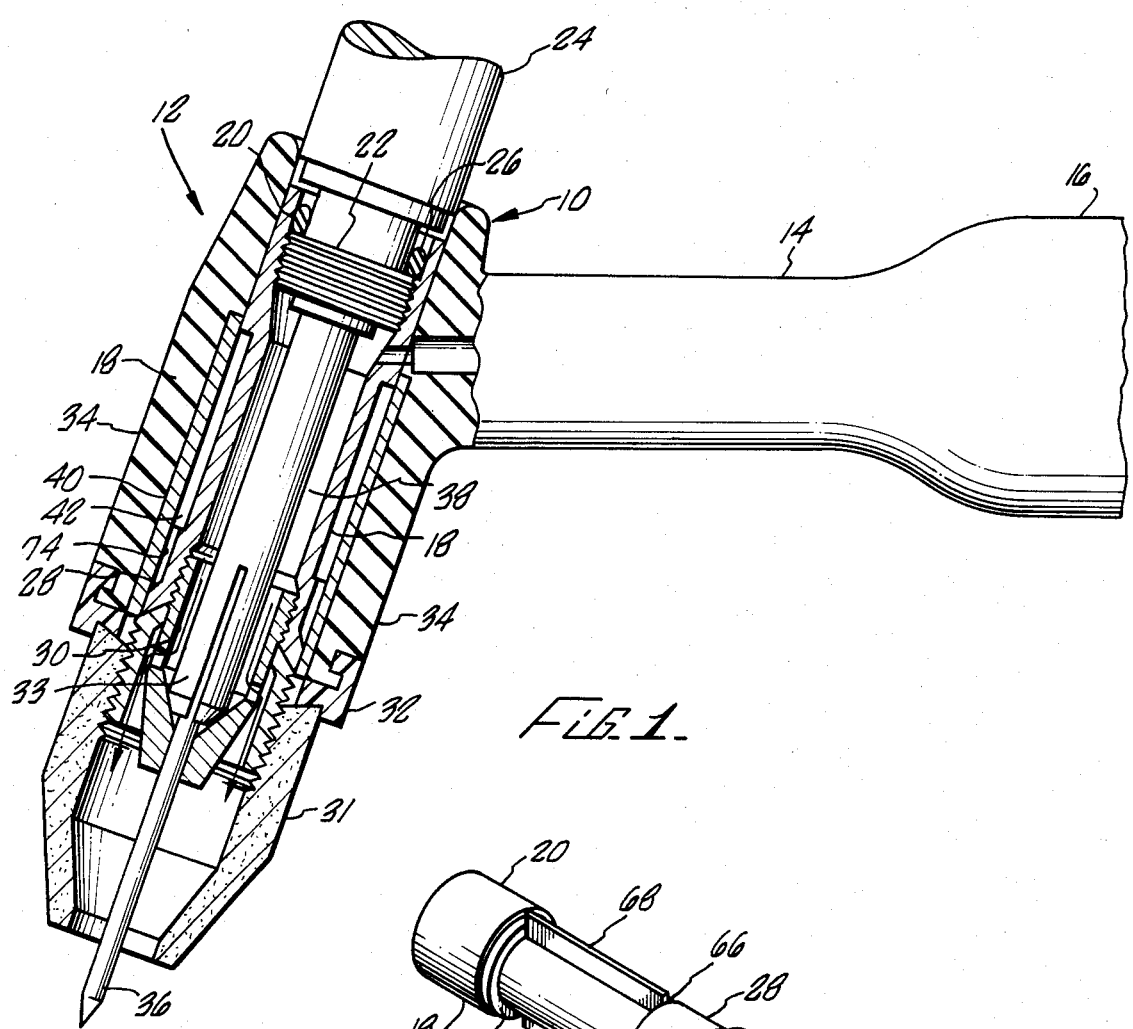
FIG. 1.
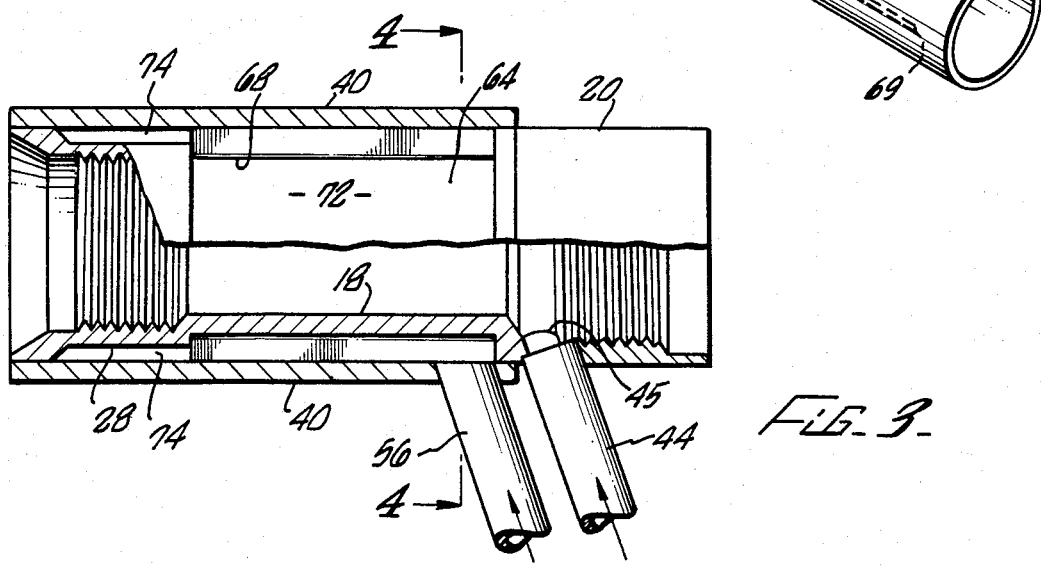
FIG. 2.
FIG. 3.

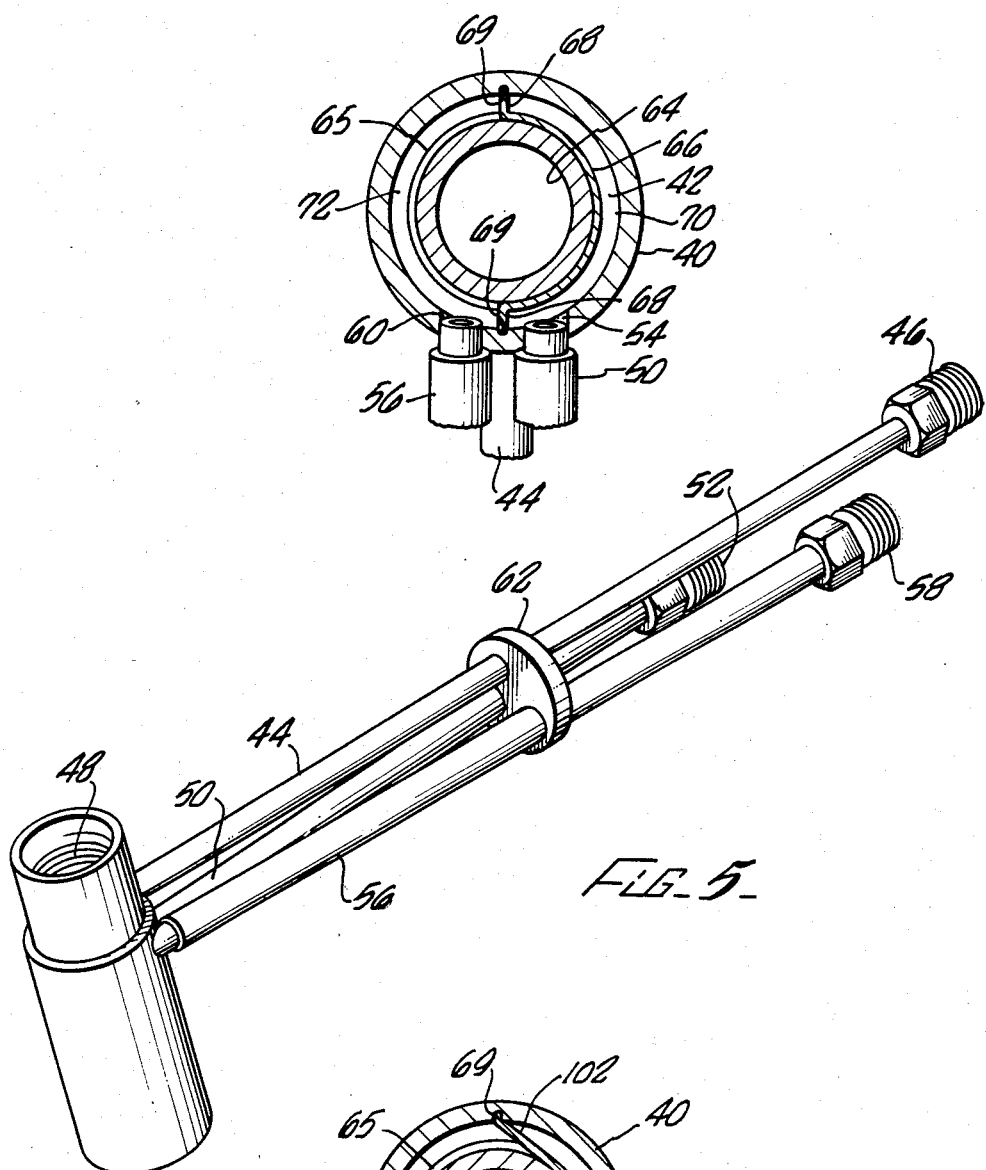

FLUID BAFFLE ASSEMBLY FOR A WATER-COOLED WELDING TORCH

BACKGROUND OF THE INVENTION

The present invention relates to a highly economical fluid baffle assembly for use in a variety of water-cooled welding and cutting torches such as the gas tungsten arc type, gas metallic arc type, metallic inert gas type or plasma arc welding or cutting, to provide efficient cooling of the torch head. Currently, several different types of water conduit systems are employed in such torches to direct the incoming water from a water inlet tube to the torch head, circulate the water about the head and expell the heated water back through the outlet tube. The systems currently in use, however, either fail to provide efficient cooling of the torch head and/or require time consuming manufacturing techniques which significantly increases the cost of construction.

One of the types of water cooling systems frequently employed in such torches involves the use of a metallic tube which conveys the water to the torch head, loops about the head and returns the water to the outlet tube. Such systems not only require silver brazing or soldering to provide the necessary seals and mechanical couplings as well as milling of the mating parts but also provide a very inefficient cooling of the torch head. This poor cooling efficiency results from a combination of a small surface area to effect the heat transfer and the fact that the cooling water generally passes too quickly through the tube to provide the time necessary for effective heat transfer to occur.

In an effort to avoid the problem inherent in water cooled torches employing water carrying coils, water chambers have been utilized in the area of the torch head. In such torches the water is directed into the chamber by a suitable inlet conduit and withdrawn therefrom by similar means. However, the water flowing through the chamber will necessarily follow the path of least resistance causing stagnant areas develop within the water chamber while the main water flow passes through a relatively small area of the chamber. The result is in poor heat transfer and inadequate cooling of the torch head.

In an effort to improve the fluid flow characteristics in water-cooled torches employing water cooling chambers, different types of baffle systems have been employed. Such systems, however, involve the same securement techniques employed in those torches utilizing cooling tubes, i.e., silver brazing or soldering and milling which are time consuming and costly techniques. Further, to effect such connections it is necessary that the baffles be constructed of a compatible material with the torch head such as bronze or copper. As a result, corrosion inevitably occurs which significantly reduces the life of the torch head.

The fluid baffle assembly disclosed herein solves these problems. Not only does the baffle system of the present invention provide efficient heat transfer for cooling the torch head but eliminates the need for brazing or soldering as well as additional milling operations thereby providing a very inexpensive and trouble-free cooling system.

SUMMARY OF THE INVENTION

Briefly, the present invention comprises a fluid baffle assembly for water-cooled welding or cutting torches which is of simple construction, economical to manufacture and corrosion resistant. The assembly includes a self-supporting arcuate baffle held under compression within the cylindrical outer sleeve of the torch head and about a portion of the inner body portion of the torch head so as to separate the area between the sleeve and outer body portion of the head into a water inlet channel, a water outlet channel and an annular water cooling channel for the continuous passage of the cooling fluid flow therethrough.

It is the principal object of the present invention to provide an improved fluid baffle assembly for use in water-cooled welding or cutting torches.

It is another object of the present invention to provide a fluid baffle assembly for water-cooled welding torches which is of simple construction and economical to manufacture.

It is another object of the present invention to provide a fluid baffle assembly for use in water-cooled welding torches which is self-supporting and obviates the need for securement by means of silver brazing, soldering or the like.

It is yet another object of the present invention to provide a fluid baffle assembly for water-cooled welding or cutting torches which allows for more effective heat transfer from the torch head to the water flowing therethrough.

These and other objects and advantages of the present invention will become apparent from the following detailed description taken in conjunction with the accompanying drawings.

IN THE DRAWINGS

FIG. 1 is a partial cross-sectional view of a torch head embodying the baffle assembly of the present invention.

FIG. 2 is a perspective exploded view of the outer body portion of the torch head, the baffle and the torch head sleeve.

FIG. 3 is a cross-sectional view of the outer portion of the torch head, the torch head sleeve and the baffle disposed therebetween.

FIG. 4 is a cross-sectional view taken along line 4—4 in FIG. 3.

FIG. 5 is a perspective view of the torch head with the water, gas and power cables shown secured thereto.

FIG. 6 is a cross-sectional view illustrating an alternate configuration of the arcuate baffle.

DESCRIPTION OF THE PREFERRED EMBODIMENT

Referring now in detail to the drawings, a water-cooled welding torch 10 of the gas tungsten arc type embodying the present invention is illustrated therein. As seen in FIG. 1, the torch 10 is comprised of a torch head 12, torch body 14, and torch handle 16. The torch head 12 includes an inner cylindrical body portion 18, preferably constructed of copper, which, at its upper end 20, is threadably engaged with a metal insert 22 which is preferably constructed of brass and affixed within the lower end of the collet cap 24. An "O"-ring seal 26 is disposed between metal insert 22 and the upper end of cylindrical body portion 18 to prevent any gas leakage through the upper portion of the torch head. The lower end 28 of the cylindrical inner body portion 18 of the torch head is in threaded engagement with the collet body 30 which is also preferably constructed of copper.

A nozzle 31 constructed of ceramic material is threadably engaged with the lower end of the collet body 30 and a nozzle gasket 32 constructed of a teflon insulating material is disposed between the upper end of the nozzle 31 and the outer insulating jacket 34 of the torch head. The tungsten electrode 36 is held by the collet body 30 within nozzle 31 and the cylindrical collet 38. An outer cylindrical sleeve 40 preferably constructed of brass is disposed about and rigidly secured to the inner body portion 18 of the torch head by silver brazing or other suitable securement means. The sleeve 40 and inner body portion 18 define an elongated annular water chamber 42 therebetween.

Through the aforesaid construction, it can be seen that when the collet cap 24 is loosened, the lateral pressure on the collet 38 is relaxed and the electrode is free to be linearly moved within the collet or removed. As the collet cap is rotated in a clockwise direction, the metal insert 22 in the collet cap urges the collet 38 against the tapered end portion of the collet body 30 tightening the longitudinally split end 33 of the collet about the electrode.

FIG. 5 illustrates the means by which the cooling water, gas and power are provided to the torch head portion 12. As can be seen therein, a gas inlet tube 44, constructed of copper, extends from the gas tube fitting 46, preferably constructed of brass, through the handle and body portions of the torch and through an aperture 45 in the upper end of the inner body 18 of the torch head, thereby communicating the area 48 within the torch head disposed about collet 38 with a source of gas (not shown). The cooling water is supplied to the torch head by means of an inlet tube 50, preferably constructed of copper, which extends from a brass water tube fitting 52 into the torch head 12 through an aperture 54 in cylindrical sleeve 40, thereby communicating the water chamber 42 with a source of pressurized water (not shown). The water outlet tube 56, preferably constructed of copper, which also functions as the power cable tube, extends between a brass power cable fitting 58 and an aperture 60 in cylindrical sleeve 40 thereby communicating the water outlet tube 56 with chamber 42. The gas inlet tube 44, water inlet tube 50 and cable and water outlet tube 56 are all held together within the torch handle 16 by means of an apertured brass slug 62 and secured to sleeve 40 by silver brazing to insure water and gas tight joints.

The baffle assembly by which the cooling water is circulated from the water inlet tube 50 about the torch head 12 and back through the outlet tube 56 is best illustrated in FIGS. 2, 3 and 4. As seen therein, the inner body portion 18 of the torch head has an enlarged upstream end 20 which, as noted above threadably engages the metal insert 22 in collet cap 24, a central portion 64 of reduced constant outer diameter terminating in a radial walls 65 and an enlarged downstream end 28 which abuts and threadably engages the collet body 30. A thin arcuately shaped baffle 66, preferably constructed of stainless steel about 0.003–0.015 inches thick, is disposed about and against one side of the central reduced diameter portion 64 of the inner body portion 18 of the torch head. Baffle 66 is provided with radially extending lateral flanges 68 which are held within grooves 69 disposed 180 degrees apart in the interior wall of brass sleeve 40. With the flanges 68 secured in opposite grooves 69 the thin baffle is held under compression against one side of the inner body portion 18 of the torch head, securing the baffle in place and, as seen in FIGS. 3 and 4, dividing the portion of the water chamber 42 about the central reduced diameter portion 64 into an inlet water channel 70 and a separate outlet water channel 72. The portion of the water chamber 42 downstream of the lower edge 66 of baffle 66 defines an annular water cooling chamber 74.

Through the aforesaid configuration, inlet water channel 70 communicates with the water inlet tube 50; outlet water channel 72 communicates with the water outlet tube 56; and channels 70 and 72 communicated with the annular water cooling chamber 74. Accordingly, water under pressure passing through the water inlet tube 50 flows downwardly through inlet channel 70 and into the annular cooling chamber 74 and circulates about the lower portion of the torch head 12. The circulating cooling water then flows upwardly through outlet channel 72, into outlet tube 56 and out of the torch.

To facilitate proper installation of the baffle assembly, the grooves 69 in the interior side wall of sleeve 40 are formed so as to extend a distance at least equal to the combined lengths of the constant reduced diameter portion 64 of the inner body portion 18 of the torch head and the enlarged upper end 20 thereof. By so limiting the length of the grooves, the proper positioning of the baffle 66 about the reduced diameter portion 64 is insured.

In an alternate configuration of the baffle, numbered 100 in FIG. 6, the radial end flanges are connected on the outer edges 102 thereof are disposed within grooves 69 in sleeve 40. Various changes and modifications may be made in carrying out the present invention without departing from the spirit and scope thereof. Insofar as these changes and modifications are within the perview of the appended claims, they are to be considered part of the present invention.

I claim:

1. A baffle assembly for use in welding and cutting torches of the water-cooled type, said assembly comprising a cylindrical torch head member having an upper end, a lower end, and a central portion of substantially constant outer diameter, said diameter being less than the outer diameters of said end portions of said member; a cylindrical outer sleeve disposed about said lower end of said member and said central portion of said member and defining an annular chamber therebetween, said sleeve having a pair of diametrically opposed grooves in the interior thereof; and an arcuate baffle member disposed about said central portion of said torch head member and defining a pair of lateral radial flanges, said flanges being disposed within said grooves so as to maintain said baffle in compression about and against said central portion of said torch member thereby separating said annular chamber into a water inlet channel, a water outlet channel and an annular lower cooling chamber, said inlet channel being separated from said outlet channel and said channels communicating with said lower cooling chamber.

2. The combination of claim 1 wherein the length of said grooves in said sleeve is equal to the combined lengths of said central portion and said upper end of said torch head member.

3. In a water-cooled welding and cutting torch of the type having an inner cylindrical wall and outer cylindrical wall defining an annular chamber therebetween for the ingress and egress of water therethrough, the improvement comprising: a baffle member defining an arcuate elongate body portion and a pair of lateral flanges extending along the length thereof and projecting radially therefrom and a pair of diametrically opposed grooves in the interior of said outer cylindrical wall, the spacing between said grooves being less than the transverse dimension of said baffle member such that upon disposing said flanges within said grooves, said baffle member is held in compression therebetween with said body portion thereof bearing against said inner cylindrical wall and said flanges separating said annular chamber into a water inlet channel, a water outlet channel and an annular lower cooling chamber, said inlet channel being separated from said outlet channel by said flanges and said channels communicating with said lower cooling chamber.

4. The combination of claim 3 wherein said baffle member is constructed of stainless steel.

* * * * *